United States Patent
Johann et al.

(10) Patent No.: US 9,957,806 B2
(45) Date of Patent: May 1, 2018

(54) METHOD FOR PRODUCING A TANDEM BLADE WHEEL FOR A JET ENGINE AND TANDEM BLADE WHEEL

(71) Applicant: Rolls-Royce Deutschland Ltd & Co KG, Blankenfelde-Mahlow (DE)

(72) Inventors: Erik Johann, Berlin (DE); Jens Ortmanns, Schwielowsee (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 275 days.

(21) Appl. No.: 14/641,743

(22) Filed: Mar. 9, 2015

(65) Prior Publication Data
US 2015/0252674 A1    Sep. 10, 2015

(30) Foreign Application Priority Data
Mar. 10, 2014  (DE) ........................ 10 2014 204 346

(51) Int. Cl.
*F01D 5/14*       (2006.01)
*B22F 3/22*       (2006.01)
(Continued)

(52) U.S. Cl.
CPC .............. *F01D 5/147* (2013.01); *B22F 3/225* (2013.01); *B22F 5/04* (2013.01); *F01D 5/14* (2013.01);
(Continued)

(58) Field of Classification Search
CPC . F01D 5/147; F01D 5/14; F01D 5/143; F01D 9/04; B22F 3/225; B22F 5/04; Y10T 29/49321; Y02T 50/673
(Continued)

(56) References Cited

U.S. PATENT DOCUMENTS 3,883,264 A * 5/1975 Rao ........................... F01D 1/04
                                                             415/119
4,874,289 A   10/1989 Smith et al.
(Continued)

FOREIGN PATENT DOCUMENTS

DE    3924829     7/1991
DE    10053361    6/2002
(Continued)

OTHER PUBLICATIONS

European Search Report dated Aug. 7, 2015 for counterpart European Application No. 15157417.5.
(Continued)

*Primary Examiner* — Dwayne J White
*Assistant Examiner* — Aaron R Eastman
(74) *Attorney, Agent, or Firm* — Shuttleworth & Ingersoll, PLC; Timothy Klima

(57) ABSTRACT

A method for the manufacture of a double-row blade wheel for a fluid-flow machine that includes a first grid row with a plurality of first blades and a second grid row with a plurality of second blades is provided. The method includes the following steps: manufacturing a first grid row or segments of the first grid row; manufacturing a second grid row or segments of the second grid row, independently of the first row; and after the respective manufacture, connecting the first grid row to the second grid row or connecting segments of the first grid row and/or of the second grid row to one another or to one of the grid rows.

8 Claims, 5 Drawing Sheets

(51) Int. Cl.
*B22F 5/04* (2006.01)
*F01D 9/04* (2006.01)

(52) U.S. Cl.
CPC ............... *F01D 5/143* (2013.01); *F01D 9/04* (2013.01); *Y02T 50/673* (2013.01); *Y10T 29/49321* (2015.01)

(58) Field of Classification Search
USPC ....................................................... 415/209.1
See application file for complete search history.

(56) References Cited

U.S. PATENT DOCUMENTS

| | | | |
|---|---|---|---|
| 5,152,661 A * | 10/1992 | Sheets | F01D 5/145 415/206 |
| 5,984,631 A * | 11/1999 | Tolgos | F01D 5/142 415/119 |
| 6,009,249 A | 12/1999 | Weber | |
| 6,099,245 A | 8/2000 | Bunker | |
| 6,099,249 A * | 8/2000 | Hashimoto | F01D 5/142 415/181 |
| 6,511,285 B2 | 1/2003 | Dodd | |
| 7,445,426 B1 | 11/2008 | Matheny et al. | |
| 8,534,997 B2 | 9/2013 | Guemmer | |
| 2002/0057966 A1 | 5/2002 | Fiala et al. | |
| 2005/0244269 A1 | 11/2005 | Loudet | |
| 2008/0134685 A1 | 6/2008 | Bunker et al. | |
| 2011/0192166 A1* | 8/2011 | Mulcaire | G08G 1/01 60/751 |
| 2011/0318172 A1* | 12/2011 | Hoeger | F01D 5/142 415/181 |
| 2012/0099969 A1* | 4/2012 | Gilman | F01D 5/22 415/170.1 |
| 2013/0039753 A1* | 2/2013 | Ikeguchi | F04D 29/542 415/207 |
| 2013/0209241 A1* | 8/2013 | Gomez | F01D 9/00 415/185 |
| 2014/0064952 A1* | 3/2014 | Clemen | F01D 5/14 415/208.2 |
| 2014/0072433 A1 | 3/2014 | Holloway | |
| 2015/0044017 A1* | 2/2015 | Smith | F01D 9/02 415/1 |

FOREIGN PATENT DOCUMENTS

| | | |
|---|---|---|
| DE | 102007035726 | 2/2009 |
| DE | 102011084125 | 4/2013 |
| DE | 102013109844 | 5/2014 |
| EP | 2218876 | 8/2010 |
| EP | 2261463 | 12/2010 |
| EP | 2626514 | 8/2013 |
| GB | 2235734 | 3/1991 |
| GB | 2405184 | 2/2005 |
| JP | 2011196254 | 10/2011 |
| WO | 2012095220 | 7/2012 |

OTHER PUBLICATIONS

German Search Report dated Oct. 10, 2014 for counterpart German Application No. 10 2014 204 346.8.

\* cited by examiner

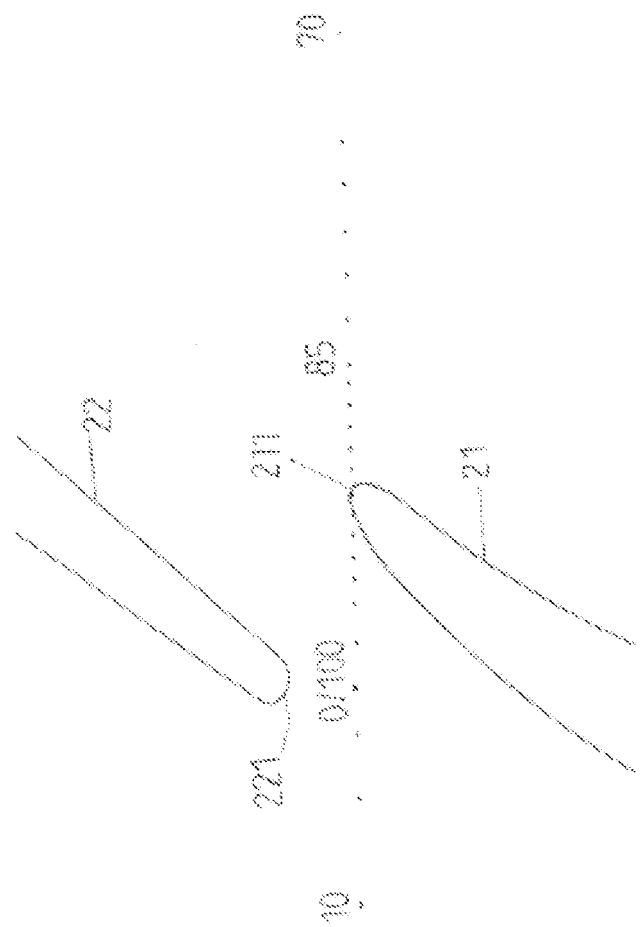
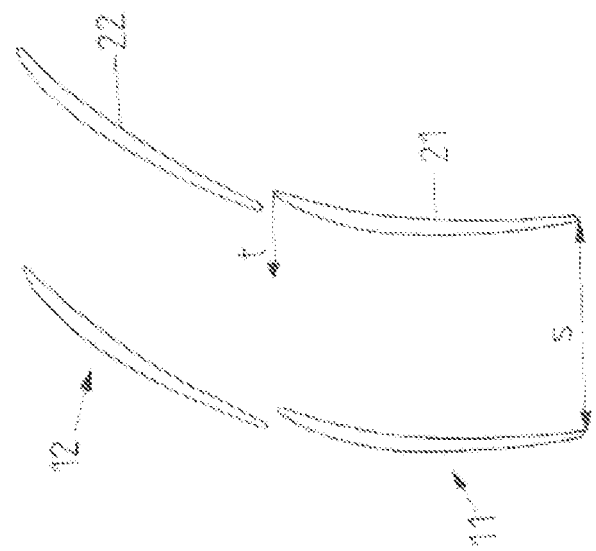

METHOD FOR PRODUCING A TANDEM BLADE WHEEL FOR A JET ENGINE AND TANDEM BLADE WHEEL

CROSS-REFERENCE TO RELATED APPLICATION

This application claims priority to German Patent Application No. 10 2014 204 346.8 filed on Mar. 10, 2014, the entirety of which is incorporated by reference herein.

BACKGROUND

This invention relates to a method for the manufacture of a double-row blade wheel for a fluid-flow machine and to a double-row blade wheel.

It is known to use double-row blade wheels, also referred to as tandem blade wheels, in a fluid-flow machine. A fluid-flow machine with a double-row stator wheel is known from EP 2 261 463 A2, said wheel including two directly adjacent, stationary stator vane rows. A double-row blade wheel is for example also known from U.S. Pat. No. 6,009,249 A.

With a double-row blade wheel, it must be ensured that the offset in the circumferential direction between the blades of the two grid rows of the double-row blade wheel is exactly set. In a stator wheel, this offset in the circumferential direction, and the act of providing it, is also referred to as circumferential positioning or "clocking".

Compared with blade wheels with only one grid row, a double-row blade wheel thus requires a considerable construction effort, since the two grid rows have to be positioned very precisely relative to one another to achieve an aerodynamic advantage over a single-row design of the blade wheels. This leads to double-row blade wheels only being used for specific aerodynamic tasks and not being widespread so far.

SUMMARY

An object underlying the present invention is to provide a method for manufacturing a double-row blade wheel that permits simplified manufacture of a blade wheel of this type. Furthermore, a correspondingly simplified double-row blade wheel is to be provided.

It is a particular object of the present invention to provide solution to the above problems by a method having the features as described herein and a double-row blade wheel having the features as described herein.

Accordingly, the solution in accordance with the invention provides that the first grid row and the second grid row are manufactured independently of one another and connected to one another after their separate manufacture. Furthermore, it can be provided that one of the two grid rows or both grid rows consist of a plurality of segments each forming a grid row. In this case too, the respective segments and grid rows are manufactured independently of one another and only then, i.e. after said separate manufacture, connected to one another or to one of the grid rows.

The feature that the second grid row or segments of the second grid row are manufactured independently of the first grid row or segments of the first grid row must be understood to mean that the two grid rows or their segments are not manufactured from the very start as one part, but consist of individual parts that are then connected to one another. It is not ruled out here that the two grid rows and the individual segments are manufactured in a common process, for example by a casting process, but as separate components. It can also be provided that segments of a grid row are manufactured by subdividing a grid row designed as a complete ring.

The solution in accordance with the invention makes use of the knowledge that tolerances present in the grid rows or grid row segments manufactured independently of one another can be compensated for by the tolerance of the other grid row or other grid row segments. It is thus provided that the grid rows and/or the segments of the grid rows are connected in a position in which a required relative position is achieved in the circumferential direction between the first blades of the first grid row and the second blades of the second grid row.

The solution in accordance with the invention of manufacturing the two grid rows independently of one another thus permits, by setting the relative position in the circumferential direction of the two grid rows or segments of the two grid rows before their connection, minimization of the tolerance in respect of the required relative position of the blades of the two grid rows ("clocking").

According to an exemplary embodiment of the invention, it is provided that the manufacture of the first grid row includes the manufacture of an annular support on which a plurality of the first blades is arranged. Similarly, the manufacture of the second grid row includes the manufacture of a second annular support on which a plurality of the second blades is arranged.

It can be provided here that the first annular support and the second annular support are each designed as a complete ring, and said two complete rings are connected to one another, for example by welding and/or positive connections. The two annular supports, carrying the blades of the blade rows, are here suitably positioned before they are connected in respect of the required relative position of the blades, for which an appropriate adjustment procedure can be performed.

According to an alternative embodiment, the first annular support and/or the second annular support is/are formed not as a complete ring, but from a plurality of circular segments. In particular, an advantageous embodiment provides that one of the two supports is formed as a complete ring and the other one of the two supports is formed by circular segments which are successively connected to the complete ring.

To do so, it can be provided that a first circular segment of the one grid row is connected to the complete ring of the other grid row, with a required relative position being set in the circumferential direction between blades of the first circular segment and blades of the complete ring. Since a circular segment of this type has, in comparison with the complete ring, a lower number of blades, the blades of the circular segment can be positioned relative to the blades of the complete ring of the other grid row with very high precision, i.e. a required offset ("clocking") can be set with high precision even though the circular segment and the complete ring have tolerances. With this procedure, the tolerances of the components can be compensated for.

Following this, a further circular segment is connected to the complete ring. This is also achieved with the setting of a required relative position in the circumferential direction between the blades of the circular segment and the blades of the complete ring. In this way, the one blade row provided in segments is successively connected to the other blade row provided as a complete ring, with the appropriate segment being individually positioned to provide a required offset of the blades of the two grid rows before each connection.

In accordance with an embodiment of the present invention, it is provided that the first grid row and/or the second grid row and/or segments of said grid rows are each manufactured by a metal casting process, a metal injection moulding process, by forging and/or milling and are subsequently connected to one another. In particular, it can be provided that the support and the blades of a grid row arranged on said support are manufactured by a metal casting process, a metal injection moulding process, by forging and/or milling as a complete ring or as segments. The segments can also be provided by separation of a grid row initially manufactured as a complete ring.

Alternatively it can be provided that only the supports of the grid rows or segments of the supports are manufactured by a metal casting process, a metal injection moulding process, by forging and/or milling, where blades manufactured otherwise are then connected to the support.

The support of a grid row is understood to be any structure suitable for carrying stator vanes or rotor blades of a stator or rotor. It can be an annular outer shroud and/or an annular inner shroud, which are assembled together with the blades to form an integral component or cast in one piece. A support can however also be, for example, a disk or elements of the casing and/or of the hub of a gas turbine.

According to a further embodiment of the invention, it is provided that the grid rows and/or the segments of the grid rows are connected in a position in which the relative distance in the circumferential direction between the blades of the first grid row and the respectively adjacent blades of the second grid row is dimensioned such that it is within a tolerance range for positioning which is between about 80% and 95% for values of the relative distance. The result achieved here is that the efficiency of the stage is not impaired, even when—despite the highly precise relative positioning of the respective blades to one another achieved by the described manufacturing method—there are still minor tolerances.

The double-row blade wheel manufactured using the method in accordance with the invention can generally be a rotor wheel or a stator wheel of a compressor or of a turbine. According to an embodiment, the double-row blade wheel in accordance with the present invention is used as guide vane assembly of a compressor, in particular as outlet guide vane (OGV) of a compressor.

The present invention also relates to a double-row blade wheel for a fluid-flow machine having a first grid row and a second grid row which are arranged adjoining one another in the flow direction of a gas flowing through the grid rows. The first grid row and the second grid row are manufactured independently of one another and/or include segments manufactured independently of one another. The first grid row and the second grid row are connected to one another to form the double-row stator wheel, or segments of the first grid row and/or segments of the second grid row are connected to one another or to one of the grid rows. The grid rows and segments are here connected to one another irreversibly and non-rotatably, such that they form one part after connection.

The manufacturing method is evident in the finally assembled double-row blade wheel from the continuing existence of appropriate connecting means, such as for example the existence of welds and/or positive connections of the two grid rows or of segments of the grid rows.

BRIEF DESCRIPTION OF THE DRAWINGS

The present invention is more fully described in the following with reference to the figures of the accompanying drawing showing an exemplary embodiment.

FIG. 4 shows two blades of a first grid row and two blades of a second grid row of a double-row blade wheel.

FIG. 5 schematically shows possible positions of the offset in the circumferential direction of a blade of the one grid row and of a blade of the other grid row of a double-row blade wheel.

DETAILED DESCRIPTION

Figure 1:
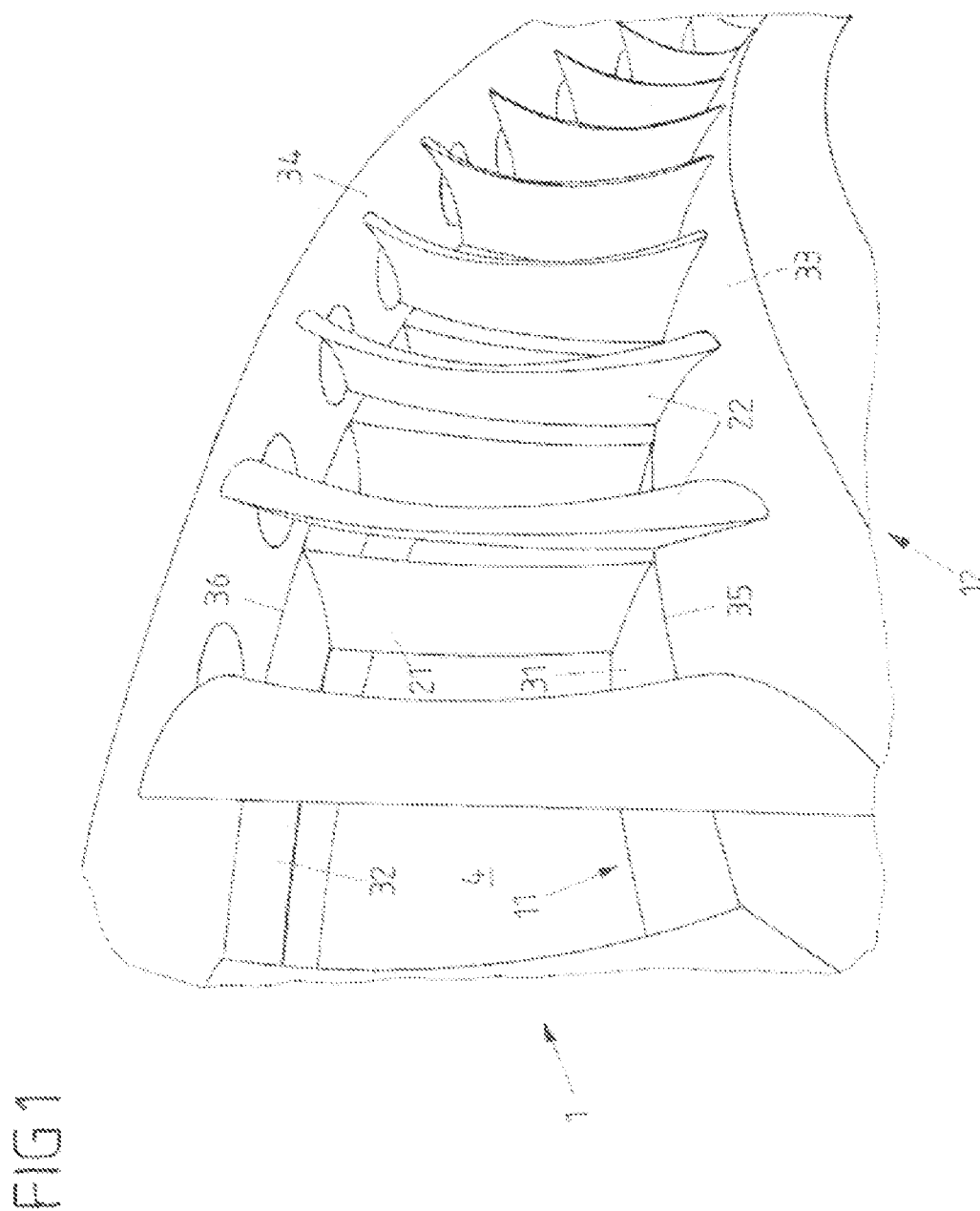
FIG. 1 shows a perspective view of an exemplary embodiment of a double-row blade wheel.

FIG. 1 shows a double-row blade wheel 1. This applies for example to a double-row stator wheel or a double-row outlet guide vane assembly of a compressor of a jet engine. Generally speaking, a correspondingly designed blade wheel can be used in any fluid-flow machines, such as in particular in blowers, compressors, turbines, pumps and fans.

The double-row blade wheel 1 includes a first grid row 11 and a second grid row 12. The first grid row 11 has a plurality of first stator vanes (blades) 21 arranged on an annular support including an inner shroud 31 and an outer shroud 32. The inner shroud 31 and the outer shroud 32 are each designed annular.

Similarly, the second grid row 12 has a plurality of second stator vanes (blades) 22 arranged on a support including an inner shroud 33 and an outer shroud 34. The inner shroud 33 and the outer shroud 34 are also designed annular.

The inner shrouds 31, 33 and the outer shrouds 32, 34 define the radially inner and the radially outer boundaries of a circular main flow path 4, in which the first blades 21 and the second blades 22 are arranged.

In each case, two stator vanes (blades) 21, 22 arranged one behind the other in the flow direction form a tandem blade of the double-row blade wheel. Both grid rows 11, 12 here have the same number of blades 21, 22, so that in each case two blades 11, 12 are associated with one another.

Figure 2:
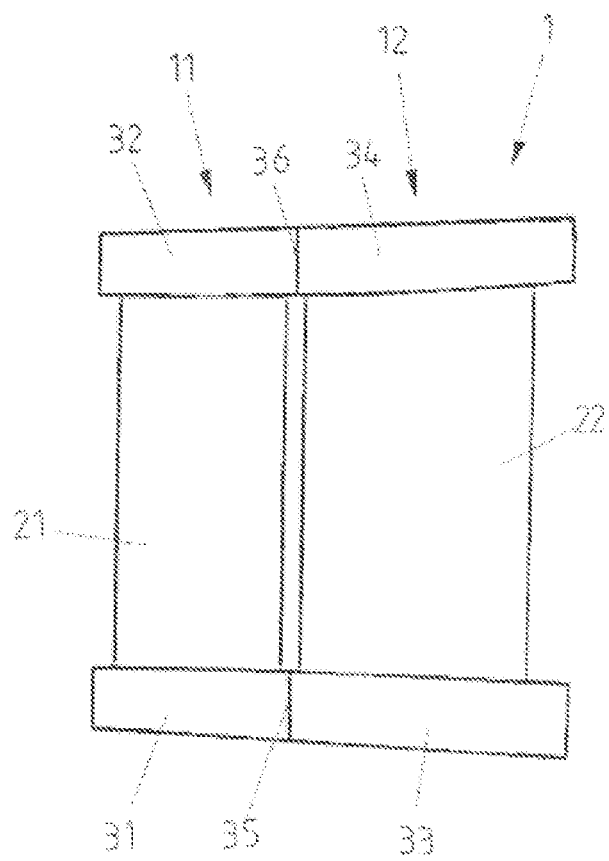
FIG. 2 schematically shows a double-row blade wheel as per FIG. 1 in sectional representation.

FIG. 2 schematically shows a double-row blade wheel 1 as per FIG. 1 in axial sectional view. Shown here are the first and second grid rows 11, 12, first and second rotor blades 21, 22 as well as the inner and outer shrouds 31, 33, 32, 34. The first grid row 11 and the second grid row 12 are connected to one another in the area of the shrouds 31, 33 and 32, 34 at connection surfaces 35, 36. The shrouds 31, 33 and 32, 34 are for example welded or bolted to one another at the connection surfaces 35, 36.

Two blades 21, 22 of a tandem blade are arranged offset relative to one another in the circumferential direction, i.e. the leading edge of the rear blade 22 does not adjoin the trailing edge of the front blade 21 in the axial direction (unless a zero offset is provided). This is made clear in FIGS. 4 and 5. The offset in the circumferential direction between two blades 21, 22 is identified with t in FIG. 4, while the distance between the leading edges of two blades 21 of the front blade row 11 is given as s.

FIG. 5 makes clear that a plurality of relative positions is possible between the two blades 21, 22 of a tandem blade that each correspond to a different offset of the two blades 21, 22 in the circumferential direction. A circumferential indexing scale for relative positioning of the first and second blade rows relative to one another is shown in FIG. 5. In the embodiment shown relating to first and second stator vanes, a distance between each circumferentially adjacent pair of leading edges 221 of the second stator vanes 22 of the second grid row 11 is divided into 100 equal portions, corresponding to 0% to 100%, with both 0% and 100% identifying the same position aligned with respect to each leading edge 221. The scale increases from 0% to 100% in a circumferential direction moving away from a suction side of the second stator vane 22 and moving toward a pressure side of the circumferentially adjacent second stator vane 22 (i.e., to the left in FIG. 5). If the trailing edge 211 of the front blade 21 is for example at the position "0/100", the trailing edge 211 of the front blade 21 and the leading edge 221 of the rear blade 22 are located directly behind one another in the axial direction. The offset in the circumferential direction t is shown in FIG. 5 such that starting from the offset "0/100" it is indicated as a percentage relative to the maximum offset s in both directions. In one embodiment, a trailing edge 211 of the first stator vane 21 is positioned relative to the leading edge of the corresponding second stator vane 22 to be positioned toward the pressure side of second stator vane 22 at between about 80% and 95% according to the circumferential indexing scale.

The achieved offset in the circumferential direction, also referred to as "clocking", affects the flow properties of the tandem blade or of the double-row blade wheel 1. Depending on the clocking position, i.e. the relative position of the two blades 21, 22 to one another, a change in efficiency can occur. It must therefore be attempted to set with high precision a clocking position providing the highest efficiency. Various clocking positions of this type between the two blades 21, 22 are shown in FIG. 5.

To provide the most ideal offset in the circumferential direction between the blades 21 of the one grid row 11 and the blades 22 of the other grid row 12, and to simplify the manufacture of the double-row blade wheel 1, the two grid rows 11, 12 of the double-row blade wheel 1 in FIG. 1 are manufactured independently of one another. After independent manufacture, the two grid rows 11, 12 are connected to one another. Before this connection, the two grid rows 11, 12, which are both rotationally symmetrical, are rotated in the circumferential direction relative to one another until a required clocking position between the respective blades 21, 22 is obtained and an optimum efficiency is achieved.

In the required position, the two grid rows 11, 12 are then connected to one another, for example by welding of the respective shrouds 31, 33 and 32, 34, where a visible border line (at the ends of the connection surfaces 35, 36) remains between the respective shrouds 31, 33 and 32, 24 (see FIGS. 1, 2).

According to an embodiment of the invention, the annular supports or shrouds 31, 32 of the first grid row 11 and the annular supports or shrouds 33, 34 of the second grid row 12 are each designed as a complete ring. For connecting the two grid rows 11, 12, the two complete rings are connected to one another, for example by welding, along their end faces which are opposite in the axial direction, with connection surfaces 35, 36 resulting as shown in FIG. 2.

Figure 3A:
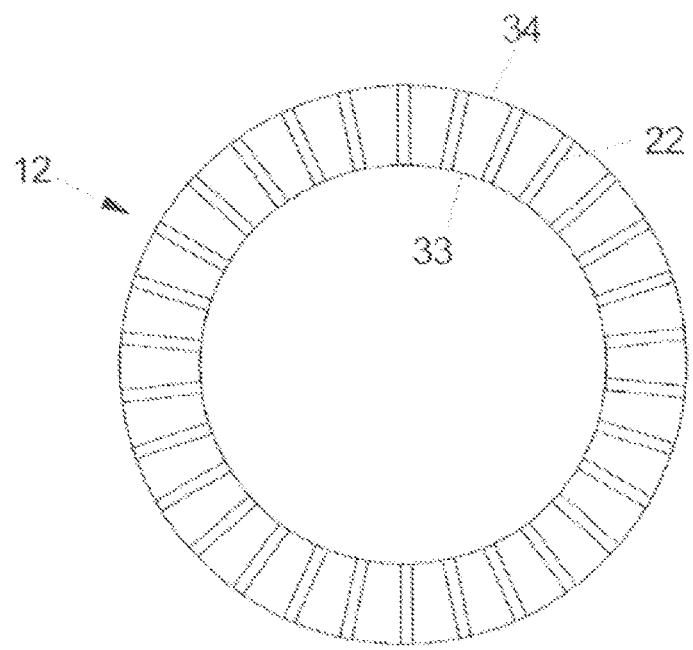
FIG. 3A schematically shows a top view in the axial direction onto a first grid row designed as a complete ring.
Figure 3B:
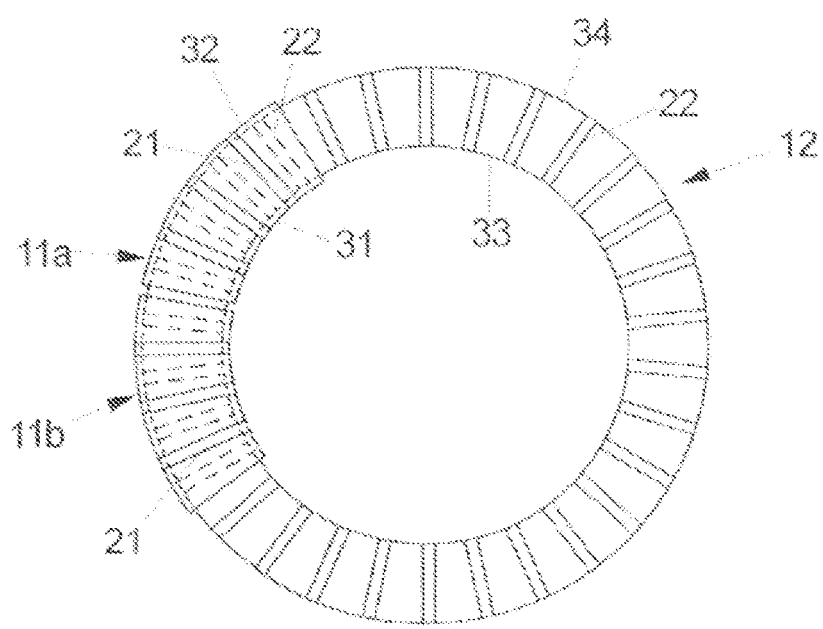
FIG. 3B shows the first grid row of FIG. 3A as well as segments of a second grid row that are arranged and positioned successively in front of the first grid row.

It can however also be provided that at least one of the two supports is not designed as a complete ring, but includes a plurality of circular segments. FIGS. 3A, 3B show an exemplary embodiment, where one of the two supports is designed as a complete ring, and the other one of the two supports is formed by circular segments.

FIG. 3A therefore first shows the rear grid row 12, which as explained in relation to FIG. 1 includes an inner shroud 33, an outer shroud 34 and a plurality of stator vanes 22. The illustration in FIG. 3A is schematic here. In front of grid row 12, grid row 11 is mounted, which has been manufactured independently of grid row 12 and includes a plurality of circular segments of which two circular segments 11a, 11b are shown in FIG. 3B.

Now circular segments 11a are successively connected to the complete ring formed by the rear grid row 12. Since the respective segment 11a, 11b has a comparatively small number of blades 21, the clocking position can be set with high precision. This setting is performed separately for each circular segment 11a, 11b before the latter is then connected to the rear grid row 12. By dividing the front grid row 11 into segments 11a, 11b, an inexpensive manufacture that provides the required clocking position with high precision can be achieved. The smaller the individual segments 11a, 11b are, the more precisely the required clocking position can be set.

The described structure of the double-row blade wheel 1 using two grid rows manufactured independently of one another or segments of grid rows permits, due to the settability of the relative position between the blades of the respective grid rows by their rotation, compensation of the naturally present tolerances regarding the position of the individual blades of the respective grid row in the circumferential position.

The two grid-rows 11, 12 and their segments 11a, 11b, respectively are for example manufactured by metal casting or by metal injection moulding. It can be provided here that the blades 21, 22 are manufactured together with at least one of the shrouds 31, 32, 33, 34 respectively by a common metal casting or metal injection moulding process. Alternatively, it can be provided that the blades are subsequently connected to the shrouds or to structures of the casing and/or hub adjoining said shrouds.

Figure 6:
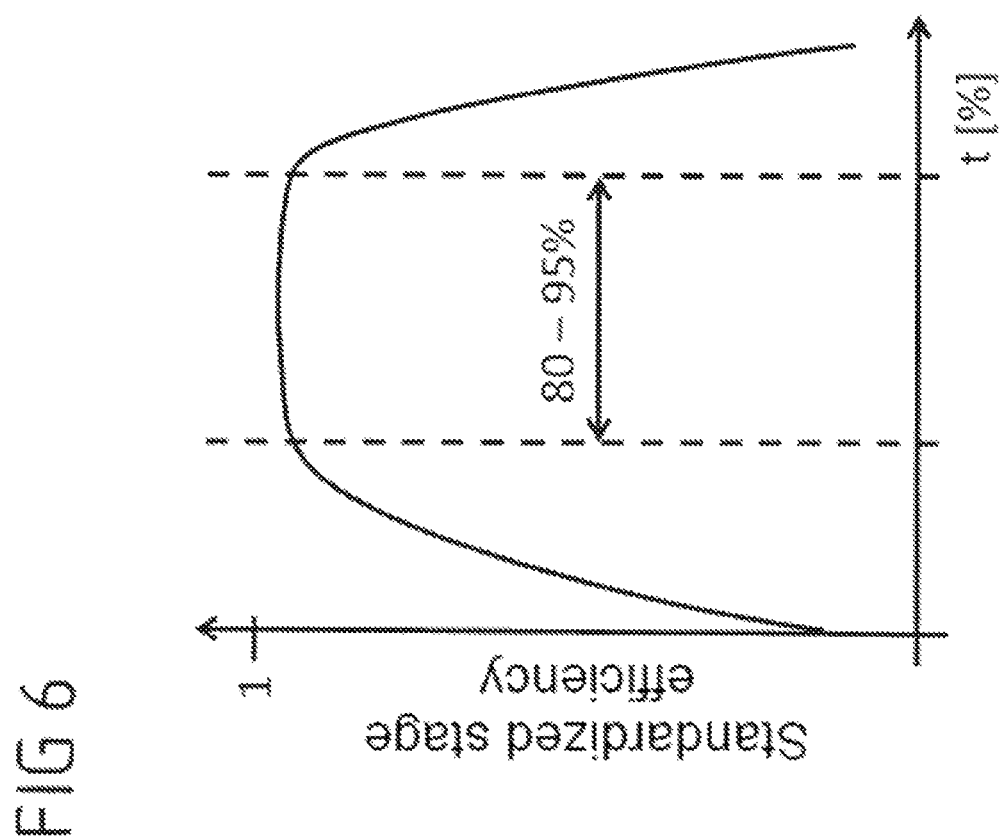
FIG. 6 shows a diagram, where the standardized efficiency of the stage is shown as a function of the relative distance in the circumferential direction between two blades, with a tolerance range for the relative positioning of the blades of the two grid rows of a double-row blade wheel being discernible.

FIG. 6 relates to the relative positioning shown in FIG. 5 between two blades 21, 22 of a tandem blade. On the abscissa axis t is plotted as a percentage, where t, as explained with reference to FIG. 4, indicates the relative distance in the circumferential direction between two blades 21, 22. The value of 100% indicates the situation that the two blades of a tandem blade are directly behind one another, i.e. the trailing edge 211 of the front blade 21 and the leading edge 221 of the rear blade 22 are axially exactly behind one another, cf. FIG. 5. The abscissa axis indicates the standardized efficiency of the stage.

The curve in FIG. 6 shows that with values of t between about 80% and 95% there is a relatively large tolerance range for positioning. Within this tolerance range, the clocking position can vary, i.e. minor tolerances of the clocking position within the tolerance range are harmless. Due to this circumstance, the efficiency is not impaired if minor tolerances still remain, despite the highly precise relative positioning of the respective blades 11, 12 to one another achieved by the described manufacturing method.

The present invention, in its design, is not restricted to the exemplary embodiments presented above, which are only to be understood as examples. In particular, the design type of the grid rows and the embodiment of the blades may depart from the exemplary embodiments shown.

What is claimed is:

1. A method for manufacturing a double-row blade wheel for a fluid-flow machine that includes a first grid row with a plurality of first blades and a second grid row with a plurality of second blades, comprising:
   manufacturing the first grid row,
   independently of the manufacturing the first grid row, manufacturing the second grid row,
   manufacturing at least one chosen from the first grid row and the second grid row from a plurality of circular segments;
   after the manufacturing of the first grid row and the second grid row, connecting the first grid row to the second grid row;
   wherein the manufacturing of the first grid row includes manufacturing a first annular support on which the plurality of the first blades is arranged, and the manufacturing of the second grid row includes manufacturing a second annular support on which the plurality of the second blades is arranged;
   wherein the first and second grid rows are connected together in a position in which there is a circumferential offset between the plurality of first blades of the first grid row and the respectively adjacent plurality of second blades of the second grid row according to a circumferential indexing scale for relative positioning of the first and second grid rows relative to one another,
   wherein the second grid row is downstream from the first grid row in a direction of fluid flow through the double-row blade wheel,
   wherein a distance between each circumferentially adjacent pair of leading edges of the plurality of second blades is divided into 100 equal portions, corresponding to 0% to 100%, with both 0% and 100% identifying a same position aligned respectively with a leading edge of each of the plurality of second blades, the circumferential indexing scale increasing from 0% to 100% in a circumferential direction moving away from a suction side of the each of the plurality of second blades and moving toward a pressure side of the circumferentially adjacent one of the plurality of second blades,
   wherein a trailing edge of a respective one of the plurality of first blades positioned adjacent the each of the plurality of second blades is positioned toward the pressure side of the each of the plurality of second blades at between 80% and 95% according to the circumferential indexing scale.

2. The method in accordance with claim 1, wherein the first and second grid rows are connected in a position in which a required relative position is achieved in a circumferential direction between the plurality of first blades and the plurality of second blades.

3. The method in accordance with claim 1, and further comprising manufacturing the circular segments of the grid rows by a metal casting process or a metal injection molding process.

4. A method for manufacturing a double-row blade wheel for a fluid-flow machine that includes a first grid row with a plurality of first blades and a second grid row with a plurality of second blades, comprising:
   manufacturing the first grid row,
   manufacturing a plurality of second circular segments for forming the second grid row, each of the plurality of second circular segments including at least one of the plurality of second blades,
   forming the second grid row by successively connecting the plurality of second circular segments to the first grid row, wherein each of the plurality of second circular segments is first positioned with respect to the first grid row to provide a desired circumferential positioning between the at least one of the plurality of second blades and one of the plurality of first blades and then is connected to the first grid row;
   wherein the first and second grid rows are connected together in a position in which there is a circumferential offset between the plurality of first blades of the first grid row and the respectively adjacent plurality of second blades of the second grid row according to a circumferential indexing scale for relative positioning of the first and second grid rows relative to one another,
   wherein one of the first and second grid rows is downstream from the other of the first and second grid rows in a direction of fluid flow through the double-row blade wheel,
   wherein a distance between each circumferentially adjacent pair of leading edges of the plurality of blades of the downstream one of the first and second grid rows is divided into 100 equal portions, corresponding to 0% to 100%, with both 0% and 100% identifying a same position aligned respectively with a leading edge of each of the plurality of blades of the downstream one of the first and second grid rows, the circumferential indexing scale increasing from 0% to 100% in a circumferential direction moving away from a suction side of the each of the plurality of blades of the downstream one of the first and second grid rows and moving toward a pressure side of the circumferentially adjacent one of the plurality of blades of the downstream one of the first and second grid rows,
   wherein a trailing edge of a respective one of the plurality of blades of the upstream one of the first and second grid rows positioned adjacent the each of the plurality of blades of the downstream one of the first and second grid rows is positioned toward the pressure side of the each of the plurality of blades of the downstream one of the first and second grid rows at between 80% and 95% according to the circumferential indexing scale.

5. The method in accordance with claim 4, wherein the first grid row is positioned in an upstream position from the second grid row.

6. The method in accordance with claim 4, wherein the first grid row is positioned in a downstream position from the second grid row.

7. The method in accordance with claim 4, and further comprising manufacturing the second circular segments by a metal casting process or a metal injection molding process.

8. A method for manufacturing a double-row blade wheel for a fluid-flow machine that includes a first grid row with a plurality of first blades and a second grid row with a plurality of second blades, comprising:
   manufacturing the first grid row,
   independently of the manufacturing the first grid row, manufacturing the second grid row, manufacturing at least one chosen from the first grid row and the second grid row from a plurality of circular segments;

after the manufacturing of the first grid row and the second grid row, connecting the first grid row to the second grid row;

wherein the manufacturing of the first grid row includes manufacturing a first annular support on which the plurality of the first blades is arranged, and the manufacturing of the second grid row includes manufacturing a second annular support on which the plurality of the second blades is arranged;

wherein the first and second grid rows are connected together in a position in which there is a circumferential offset between the plurality of first blades of the first grid row and the respectively adjacent plurality of second blades of the second grid row according to a circumferential indexing scale for relative positioning of the first and second grid rows relative to one another, wherein the second grid row is downstream from the first grid row in a direction of fluid flow through the double-row blade wheel, wherein a distance between each circumferentially adjacent pair of leading edges of the plurality of second blades is divided into 100 equal portions, corresponding to 0% to 100%, with both 0% and 100% identifying a same position aligned respectively with a leading edge of each of the plurality of second blades, wherein a trailing edge of a respective one of the plurality of first blades positioned adjacent the each of the plurality of second blades is positioned at between 80% and 95% according to the circumferential indexing scale.

* * * * *